Patented Oct. 23, 1945

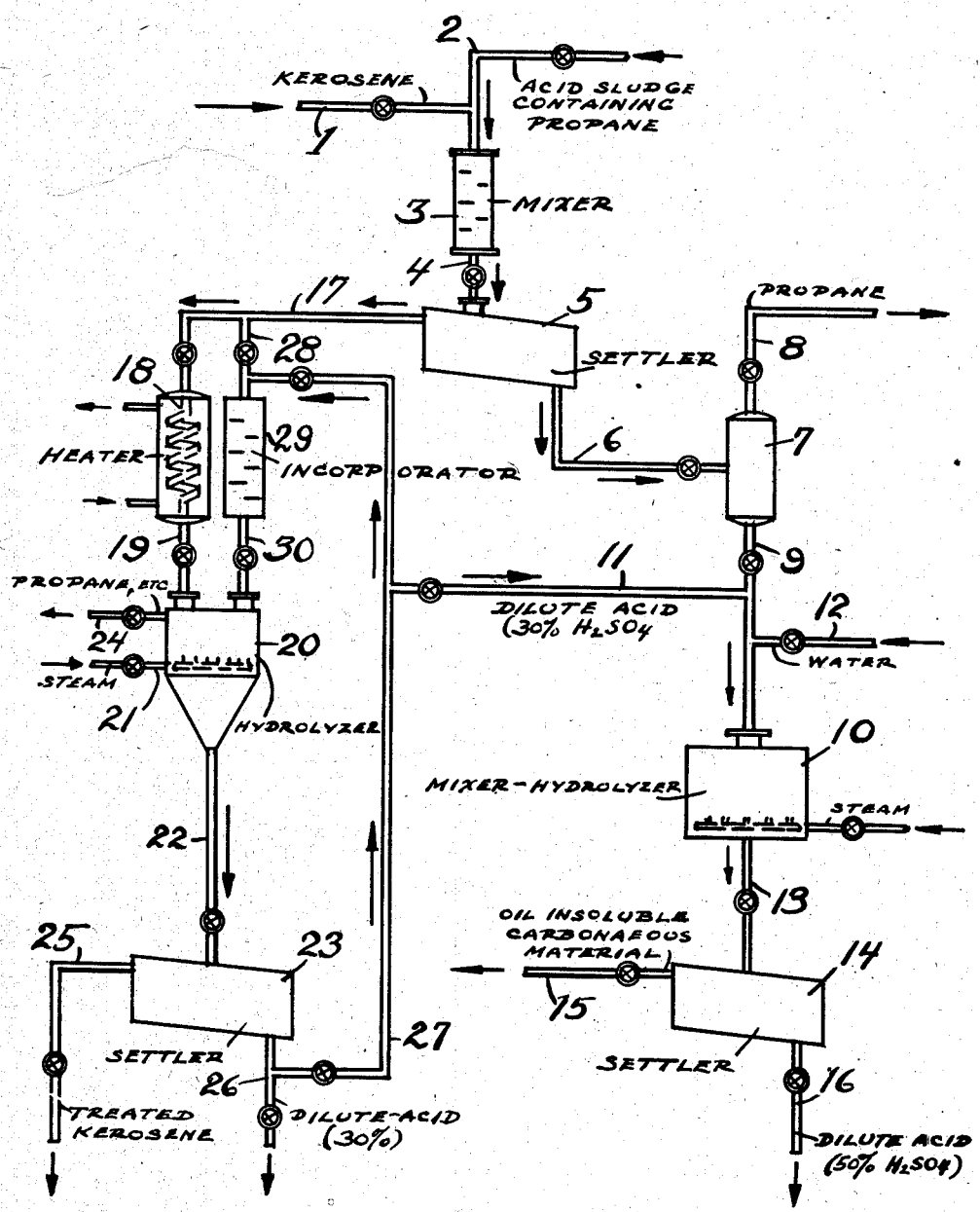

2,387,519

UNITED STATES PATENT OFFICE 2,387,519

RECOVERY OF SULPHURIC ACID FROM ACID SLUDGE

James G. Lillard, Baytown, and Reuben F. Pfennig, Goose Creek, Tex., assignors to Standard Oil Development Company, a corporation of Delaware Application July 22, 1942, Serial No. 451,872

8 Claims. (Cl. 23—173)

This invention relates to an improved procedure for the recovery of sulphuric acid from sludge materials obtained in the refining of mineral oils with concentrated sulphuric acid. More particularly the invention is concerned with the recovery of sulphuric acid from sludges resulting from the sulphuric acid treatment of residual crude petroleum fractions dissolved in liquefied normally gaseous hydrocarbons.

In the refining of heavy lubricating oil stocks, a recent development has been to effect the treatment with sulphuric acid in the presence of a liquefied normally gaseous hydrocarbon, such as propane. In this type of an operation, the propane acts simultaneously as a diluent and as a distinct treating agent. The acid sludge derived from such treating is therefore of a different character from that normally obtained from acid treating residua in the presence of an inert diluent, such as treated naphtha stock. Due to emulsion troubles, acid sludges derived from such sulphuric acid treatments of residual lubricating oil stocks, particularly from Mid-Continent or paraffinic type crudes, are difficult to decompose and resolve into their oily constituents and acid constituents by the usual hydrolysis method. In this procedure the acid sludge is agitated with water or water and a light petroleum stock. The emulsification difficulties have been largely overcome by the use of demulsifying agents and by dissolving the acid sludge first in a solvent, such as an aromatic distillate, and then hydrolyzing the mixture. Such procedures for treating acid sludges are not wholly satisfactory from the viewpoint of yields and furthermore they are relatively expensive because of the costs involved in the uses of the demulsifying agent and the solvent. The present invention is an improvement over the prior art procedures in that an effective and inexpensive means is provided for recovering acid in higher yields and in higher concentrations from acid sludges derived from the sulphuric acid treatment of residuum lubricating oil stocks in the presence of a liquefied normally gaseous hydrocarbon.

The invention is concerned with a treating procedure to which the sludge material is subjected prior to the hydrolysis step. It has been found that, if the sludge material after separation from the oil phase from which it is derived is intimately contacted with a proportionately large volume of a light petroleum oil distillate, preferably a raw or untreated distillate having a gravity between 25° A. P. I. and 55° A. P. I., an effect occurs upon the sludge which permits the material to be hydrolyzed more easily. Thus, the treatment of acid sludges with hydrocarbon distillates of the naphtha, kerosene and gas oil ranges enables the sludge material to be relatively easily hydrolyzed by either water or dilute acid without the development of emulsions. This hydrocarbon treatment of the sludge material is a means for obtaining higher yields and better concentrations of acid than hithertofore obtainable by prior art procedures. Furthermore, the acid recovered by the method of this invention is cleaner than that obtained from current conventional methods and, therefore, does not foul equipment used in concentrating it to higher strengths.

The preliminary treatment with a light petroleum oil of acid sludges derived from the sulphuric acid treatment of residum lube stocks and the separation of the oil from the sludge prior to the hydrolysis of the sludges accomplishes two desirable effects: First, the sludge material is rendered more amenable to acid recovery and, second, the sludge imparts a desirable treating effect upon the light petroleum oil. In view of this treating capacity of the acid sludge, it is advantageous to employ a raw, rather than a treated, oil as the agent for conditioning the sludge for the hydrolysis treatment. It has been found for example that in some cases the residuum acid sludges impart both acid treating and sweetening effects (similar to doctor treating) upon such raw petroleum oils as cracked naphtha, kerosene or gas oil, when such stocks are employed in accordance with the procedure of this invention. These treating effects, especially that of sweetening, are obtained as being distinctly additive to that of the commonly recognized residual acid effects of most sludge compositions. Furthermore, these effects are obtained in addition to that of favorably conditioning the sludge material for subsequent hydrolysis to which many acid sludges do not respond advantageously. Thus, it has been found that the acid sludge derived from the sulphuric acid treatment of light and medium Panhandle lubricating oil distillates in the presence of liquefied propane cannot be satisfactorily conditioned for hydrolysis by treating with raw kerosene distillate in accordance with the procedure of this invention. On the other hand, the acid sludge obtained from the sulphuric acid treatment in propane solution of Panhandle residuum heavy lubricating oil stock does respond readily to this sludge conditioning treatment.

In accordance with this invention acid sludges obtained from the sulphuric acid treatment of petroleum residuum lubricating oil stocks in a liquefied normally gaseous saturated hydrocarbon, such as ethane, propane, butane or pentane, are thoroughly mixed with a light petroleum oil distillate, such as cracked naphtha, kerosene or gas oil, and then the mixture is allowed to settle and separate into an acid phase and an oil phase. The acid phase comprises the "conditioned" sludge which is readily hydrolyzed by agitating it with water or dilute acid. Thus, the conditioned sludge is decomposed by hydrolysis into dilute acid and an oily material which may be used as a fuel or for other purposes if desired. The oil phase separated from the sludge during the conditioning treatment contains, as a rule, a considerable portion of the acid material originally present in the sludge. This acid or acid material acquired by the treating oil appears to be primarily in solution or in colloidal suspension as only a small amount of it can be removed by filtering the oil through paper. This acid material is best removed from the treating oil by hydrolysis which must be carried out under carefully controlled conditions in order to avoid emulsion difficulties. The emulsion difficulties are avoided by preheating the oil to a temperature in the range between about 170° F. and 210° F. before it is contacted with steam and/or hot water to effect hydrolysis of the acid material contained therein. The hydrolyzed mixture is then settled and separated into a dilute acid phase and a hydrocarbon phase. The hydrocarbon phase may be neutralized and then distilled to recover a light oil of marketable quality except for being very slightly sour to the doctor test and a hydrolyzed oil suitable for use in fuel oils.

The process of this invention may be better understood by reference to the attached drawing which is a flow sheet of a preferred embodiment. For purpose of description it is assumed that the acid sludge is a sludge obtained in the sulphuric acid treatment, in propane solution, of a heavy residual lubricating oil stock. It is further assumed that the light petroleum oil employed as a treating agent in the conditioning of the sludge for hydrolysis is a raw or untreated kerosene distillate.

By means of line 1, a stream of untreated kerosene distillate is introduced into a stream of propane-containing residuum acid sludge flowing through line 2 and the combined streams are introduced into mixer 3 for intimate mixing preferably at normal temperatures. For the purpose of this illustration, the amount of kerosene mixed with the sludge material is about seven times that of the sludge. The amounts of petroleum distillate material which may be mixed with the sludge is dependent upon the nature and viscosity of the sludge, as well as the hydrocarbon material, thus, it has been found that the ratio of the hydrocarbon material to the sludge may be varied from as low as 3 to 1 to as high as 12 to 1 for sludges obtained from the acid treatment in propane solution of heavy residuum lubricating oil stocks.

The oil sludge mixture, after being intimately mixed in mixing device 3, is then discharged through line 4 to a settler 5. In settler 5 the conditions are suitable for satisfactory phase separation; that is, the rate of flow therethrough and the form of the equipment are adjusted to give a desirable settling time. Although not critical, a settling period of about one hour is usually required. During this settling period the oil-sludge mixture separates into a predominantly oil phase and a predominantly sludge phase. The oil phase comprises treated kerosene together with a considerable portion of the acid material originally present in the sludge. This acid material is primarily in the form of a solution or colloidal suspension in the oil and cannot be readily separated by mechanical means.

The sludge phase separating in settler 5, comprising the so-called "conditioned sludge," is withdrawn through line 6 and passed to stripping still 7. Still 7 is supplied with suitable connections for heating and for pressure reduction so that low boiling materials, such as propane, and sulphur dioxide may be distilled overhead through line 8. The sludge then passes through line 9 and is intimately mixed in mixer-hydrolyzer 10 with dilute sulphuric acid supplied through line 11. Although it is preferable to employ dilute sulphuric acid of about 30% strength as the hydrolyzing agent, water may be introduced through line 12 and employed either alone or in supplement to dilute acid to effect hydrolysis of the sludge. In this manner, rapid and complete hydrolysis of the sludge is effected, and it usually occurs without heating except as supplied by the reaction. However, in some cases it may be desirable to employ steam as a heating and agitating medium.

The hydrolyzed mixture is passed from mixer-hydrolyzer 10 through line 13 to settler 14 wherein phase separation occurs between a substantially aqueous acid phase and an oil-insoluble carbonaceous phase. The oil-insoluble carbonaceous phase is removed from settler 14 by means of line 15 or the equivalent thereof and it may be employed as a low-grade fuel or it may be otherwise disposed of as desired. The acid phase is removed from settler 14 by means of line 16. The strength of this acid phase depends upon the proportion of water or dilute acid used to the quantity of acid present in the sludge hydrolyzed therewith. It is preferable to employ the minimum amount of water or dilute acid which is conducive to good operation in effecting the hydrolysis of the acid sludge in order to avoid unnecessary dilution of the acid phase which is subsequently concentrated to produce strong acid. Usually the acid obtained through line 16 has a concentration of about 50% $H_2SO_4$.

The oil phase comprising treated kerosene together with some acid material, as separated in settler 5, is withdrawn from settler 5 by means of line 17 and it is passed through heater 18 wherein it is preheated to a temperature above about 155° F., preferably between about 170° F. and 210° F., before being passed through line 19 to hydrolyzer 20. In hydrolyzer 20, the oil is treated with steam or hot water to effect hydrolysis of the acid material contained therein. The hydrolysis treatment is preferable to other methods of decomposing and removing acid materials from the oil since it permits recovery of the sulphuric acid involved therein. However, it is necessary that the oil be preheated to and maintained at a temperature in the range between about 155° F. and 210° F. during the hydrolysis treatment with steam or hot water, introduced by means of line 21, in order to avoid emulsion difficulties. Contact between the oil and the hydrolyzing agent in hydrolyzer 20 is maintained for a time sufficient to effect complete hydrolysis of the acid materials present in the oil, as well as the removal of low boiling materials, such as propane, before the mixture is discharged through line 22 to settler 23. A contact time of 15 to 30 minutes is usually sufficient for this purpose. The low-boiling materials are removed by means of line 24.

In settler 23, the conditions are suitably adjusted to permit satisfactory phase separation within a reasonable operation period, such as about an hour. Thus, the hydrolyzed mixture is separated into a dilute acid phase and a treated oil phase. The treated oil phase, withdrawn through line 25, is comprised of treated kerosene together with some dark, oily hydrolysis products; hence, it preferably is neutralized and redistilled to produce a kerosene of good quality except for being very slightly sour to the doctor test.

The dilute acid obtained in settler 23 is withdrawn through line 26 and may be further processed to obtain a solution of higher concentration. The strength of this dilute acid may vary over a considerable range depending upon the quantity of steam or hot water employed in the hydrolysis in proportion to the amount of acid material present in the oil being subjected to the hydrolysis treatment. Usually the proportions of these materials are adjusted to obtain a dilute acid of about 30% $H_2SO_4$ strength.

It is found advantageous in many cases to recycle and employ a portion of the acid obtained in settler 23 as a means of preheating all or a portion of the oil (containing the acid material) which is withdrawn from settler 5 by means of line 17. The recycled dilute acid also serves as an aid to the steam or hot water in effecting hydrolysis of the sludge material present in the oil. In operations of this nature, dilute acid is passed from settler 23 through lines 26 and 27 to line 28 wherein it is admixed with oil diverted from line 17. This mixture of oil and dilute acid is then passed through incorporator 29 for intimate mixing before being discharged through line 30 to hydrolyzer 20. Little or no emulsion difficulties are encountered in the hydrolysis step when the oil is preheated with dilute acid in this manner. It has also been found particularly advantageous to employ the dilute acid obtained in settler 23 as a means for hydrolyzing the acid sludge charged to mixer-hydrolyzer 10. In this mode of operation, a portion of the acid is passed from settler 23 through lines 26 and 27 to line 11 from whence it flows to mixer-hydrolyzer 10 in the manner hereinbefore described.

As a further means of understanding this invention, the following examples are presented:

*Example 1*

Two portions of a sludge material obtained from the sulphuric acid treatment of a Panhandle heavy residuum lubricating oil stock while dissolved in propane were treated for acid recovery by (1) what is commonly considered the conventional method and (2) the process according to this invention. In the first or conventional case the sludge was fluxed with an oil having a 398° F. initial boiling point, a 664° F. final boiling point and a 31.5° A. P. I. gravity. This mixture was subjected to hydrolysis treatment with water under agitating conditions which resulted in the formation of an emulsion. The hydrolyzed mixture was then treated with a demulsifying agent to resolve the emulsion and effect separation of a dilute acid phase and an oil phase. In the second case, a distillate having a 357° F. initial boiling point, a 529° F. final boiling point and a 43° A. P. I. gravity was mixed and agitated with the sludge. The mixture was then allowed to settle and separate into an oil phase and a phase of newly formed or "conditioned" sludge. The conditioned sludge was hydrolyzed by agitating it with water. In the following table the results are presented:

| | Conventional method | Present method |
|---|---|---|
| Raw sludge _____ pounds __ | 100 | 100 |
| Oil fraction added _____ do ___ | 161 | 565 |
| Demulsifying agent added _____ do ___ | 24.5 | 0 |
| Water added _____ do ___ | 66.8 | 28.9 |
| Acid in demulsifying agent _____ do ___ | 3.7 | 0 |
| Total acid (sludge plus demulsifying agent), pounds of equivalent 100% $H_2SO_4$ | 42.4 | 34.4 |
| Acid recovered, pounds of equivalent 100% $H_2SO_4$ | 35.2 | 32.3 |
| Percent total acid recovered _____ | 83.0 | 94.0 |
| Carbon in acid _____ per cent by weight __ | 3.4 | 1.0 |

These data indicate that when employing the process of the invention, higher yields of lower carbon content acid are obtained than when the conventional procedure is employed to effect acid recovery.

*Example 2*

The "conditioned" sludge, resulting from the treatment of the initial sludge material with the 43° A. P. I. gravity oil fraction of Example 1, was divided into two portions. One portion was hydrolyzed by adding water and the other portion was hydrolyzed by adding an equal volume of dilute sulphuric acid separated from settler 23 as previously described. The acid used for hydrolysis analyzed 31.3% sulphuric acid. In the following table the data are presented:

| Type of hydrolysis | Hydrolysis of conditioned sludge | |
|---|---|---|
| | Aqueous | Dilute acid |
| Hydrolysis temperature, °F _____ | 180 | 185 |
| Hydrolyzing agent added, wt. percent of sludge _____ | 96.6 | 124 |
| Acid recovery, wt. percent of charged materials _____ | 81.4 | 80.8 |
| Strength of recovered acid, wt. percent $H_2SO_4$ _____ | 35.1 | 49.8 |
| Acid recovery from "conditioned" sludge, wt. percent based on unhydrolyzed "conditioned" sludge _____ | 96.6 | 96.7 |

These data indicate that, in order to recover an acid of high concentration, it is preferable to employ dilute acid rather than water as the hydrolyzing agent.

In the prior art the advantage of employing hydrocarbons to effect a pre-treatment of sludge material in order to render the sludge more amenable for acid recovery was not appreciated. The effect of the hydrocarbons in this capacity is not understood. The effect is not that of a fluxing medium, since in many cases a particularly desirable treating effect is imparted to the hydrocarbons by the sludge and the hydrocarbon is present in the sludge during the subsequent hydrolysis treatment in only very small amounts. The effect of the hydrocarbons upon the sludge is, furthermore, believed wholly unexpected from prior art procedures for the recovery of acid from sludge materials.

Numerous advantages also follow from the use of the procedure of the present invention for the recovery of acid from acid sludges obtained in the sulphuric acid treatment of petroleum residuums while dissolved in liquefied normally gaseous hydrocarbons. The method is particularly applicable in the recovery of acid from the highly refractive sludge materials obtained in the acid treatment of Mid-Continent type residuum lube stocks while dissolved in liquefied propane. The sludge materials obtained from such processes have in the past presented considerable difficulty in refinery acid recovery processing. The higher yields of acid obtained and the lower carbon content of the acids so obtained are also important advantages of processing according to the present invention. These latter advantages are, moreover, obtained as a result of obviating many of the deteriorating reactions which have occurred in many prior art procedures involving the formation of substantial quantities of sulphuric acid materials.

While the procedure of the invention has been illustrated in connection with the use of a petroleum fraction boiling in the kerosene range with sludge obtained from the sulphuric acid treatment, in propane solution, of a Panhandle residuum heavy lubricating oil stock, other petroleum fractions within the gravity range of 25° to 55° A. P. I. such as naphtha, gas oil and heating oil, and other sulphuric acid sludges derived from the acid treatment of a petroleum residuum while dissolved in a liquefied normally gaseous hydrocarbon may be similarly employed to advantage in refinery processing.

What is claimed is:

1. In the recovery of sulphuric acid by the hydrolysis of a sludge material obtained in the treatment with concentrated sulphuric acid of a petroleum residuum oil while dissolved in a liquefied normally gaseous saturated hydrocarbon, the improvement which comprises agitating the sludge material separated from the treated petroleum residuum oil dissolved in the liquefied normal gaseous saturated hydrocarbon with a petroleum oil having a gravity of between about 25° and 55° API, settling, causing a predominantly sludge phase to separate from a predominantly oil phase, treating said oil phase with water at a temperature of between about 155° F. and 210° F. to effect the hydrolysis of the acid material contained therein, settling, causing a predominantly aqueous phase to separate from a predominantly oil phase and adding said predominantly aqueous phase to the said predominantly sludge phase to effect hydrolysis thereof.

2. The improvement according to claim 1 in which the sludge material is obtained from the treatment with concentrated sulphuric acid with a petroleum residuum oil while dissolved in liquefied propane.

3. The improvement according to claim 1 in which the petroleum oil having a gravity of between 25° and 55° API is kerosene.

4. The improvement according to claim 1 in which the treating of the predominantly oil phase with water is effected at a temperature of between about 170° F. and 210° F.

5. An improved process for the recovery of sulphuric acid from sludge material obtained in the treatment with concentrated sulphuric acid of a petroleum residuum oil dissolved in a liquefied normally gaseous saturated hydrocarbon, which comprises agitating the sludge material separated from the treated petroleum residuum oil dissolved in the liquefied normally gaseous saturated hydrocarbon with a petroleum oil having a gravity of between about 25° and 55° API, settling, causing a predominantly sludge phase to separate from a predominantly oil phase, treating the said predominantly oil phase with water at a temperature of between about 150° F. and 210° F. to effect the hydrolysis of the acid material contained therein, settling, causing a predominantly aqueous phase to separate from a predominantly oil phase and adding the said predominantly aqueous phase to the said predominantly sludge phase to effect hydrolysis thereof, settling to form separable phases of which one is predominantly acid and recovering sulphuric acid from the predominantly acid phase.

6. An improved process according to claim 5 in which the sludge material is obtained from the treatment with concentrated sulphuric acid of a petroleum residuum oil while dissolved in liquefied propane.

7. An improved process according to claim 5 in which the petroleum oil having a gravity of between 25° and 55° API is kerosene.

8. An improved process according to claim 5 in which the treating of the predominantly oil phase with water is effected at a temperature between about 170° F. and 210° F.

JAMES G. LILLARD.
REUBEN F. PFENNIG.